(12) United States Patent
Ryu (10) Patent No.: US 6,198,341 B1
(45) Date of Patent: Mar. 6, 2001

(54) SUBSTRATE BIAS VOLTAGE GENERATING CIRCUIT FOR USE IN A SEMICONDUCTOR DEVICE (75) Inventor: Hoon Ryu, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/337,485

(22) Filed: Jun. 21, 1999

(30) Foreign Application Priority Data

Jun. 19, 1998 (KR) .................................................. 98-23112

(51) Int. Cl.[7] ...................................................... G05F 1/10
(52) U.S. Cl. ............................................ 327/536; 327/537
(58) Field of Search .................................... 327/534, 535, 327/536, 537

(56) References Cited

U.S. PATENT DOCUMENTS

| 5,041,739 | * | 8/1991 | Goto ....................................... 327/536 |
| 5,120,993 | | 6/1992 | Tsay et al. ............................. 536/327 |
| 5,266,842 | | 11/1993 | Park ....................................... 536/327 |
| 5,343,088 | | 8/1994 | Jeon ....................................... 536/327 |
| 5,521,547 | * | 5/1996 | Tsukada ................................. 327/537 |
| 5,532,640 | * | 7/1996 | Okunaga ............................... 327/537 |
| 5,677,645 | * | 10/1997 | Merrit ................................... 327/536 |
| 5,939,935 | * | 8/1999 | Merrit ................................... 327/536 |

* cited by examiner

Primary Examiner—Terry D. Cunningham
(74) Attorney, Agent, or Firm—Marger Johnson & McCollom, P.C.

(57) ABSTRACT

A circuit is provided for biasing a semiconductor substrate. The circuit comprises a driving signal generating circuit and a charge pump circuit. The driving signal generating circuit produces first to fourth charge pump driving signals in response to an oscillation signal. Each of the first and fourth charge pump driving signals has a high voltage level that is higher than a power supply voltage. Accordingly, even though the power supply voltage is lowered, a loss of a pump efficiency is prevented because a PMOS transistor in the charge pump circuit is driven by the charge pump driving signal having the voltage higher than the power supply voltage.

8 Claims, 7 Drawing Sheets

Fig. 1

(Prior Art)

SUBSTRATE BIAS VOLTAGE GENERATING CIRCUIT FOR USE IN A SEMICONDUCTOR DEVICE

CROSS REFERENCE TO RELATED APPLICATIONS

This application claims priority from Korean Priority Document No. 1999-23112, filed on Jun. 19, 1998 with the Korean Industrial Property Office, which document is hereby incorporated by reference.

FIELD OF THE INVENTION

The present invention relates to a semiconductor device and, more particularly to a circuit of generating a substrate bias voltage for use in a semiconductor device.

BACKGROUND OF THE INVENTION

It is often desirable to bias the substrate of a semiconductor device. A suitable biasing voltage level is usually outside the range provided by the power supply.

All MOS memory architectures on occasion use on-chip voltage generation. While any voltage between a ground voltage and a power supply voltage is available on a semiconductor chip, for example, a memory chip, it also possible to generate on the chip voltages that are below the ground voltage and above the power supply voltage.

The most common on-chip voltage generation in MOS memories is back-bias voltage generation (referred to as "a substrate bias voltage generation" or "a reverse-bias voltage generation"). Early MOS RAMs used a power supply voltage which provided a negative bias voltage to the substrate. On-chip back-bias generation has replaced one of these power supplies in many cases.

The most important advantage of the on-chip substrate voltage generator was the reduced probability of localized forward biasing of junctions. Such forward biasing injects electrons into the substrate leading to dynamic circuit problems and, in memory devices, for example, reduced refresh times due to a collection of electrons beneath the memory storage capacitor plate for stored ones.

Speed and power characteristics also improve when an on-chip substrate voltage generator is used because transistors operate in a flatter part of the body-effect curve and because the lower junction capacitance reduces the load. Thus, the variation of a threshold voltage caused by the body effect of a transistor is minimized and the punch-through voltage is increased.

Another advantage is that the specific bit line capacitances improve, because junction capacitances contribute more to bit line capacitance than to the total storage capacitance so that a differential signal to sense amplifiers will increase. Therefore, if a constant negative voltage is supplied to the substrate by the use of the substrate voltage generator, the performance of the memory (semiconductor) chip is improved.

Figure 1:
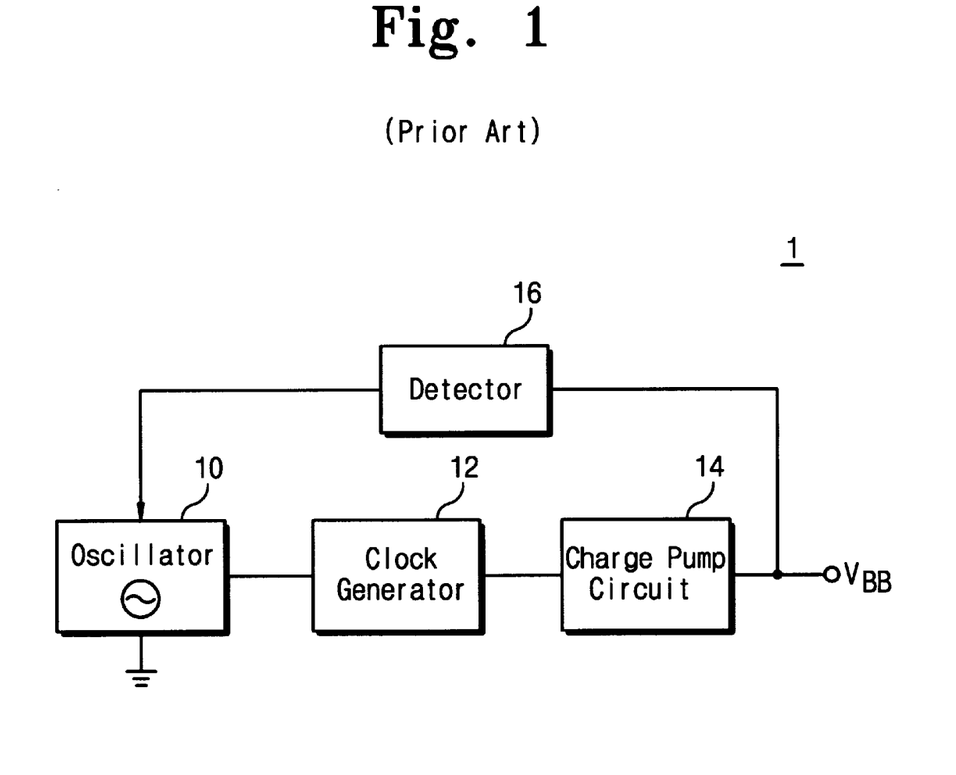
FIG. 1 is a block diagram of a conventional substrate bias voltage generator circuit in the prior art.

FIG. 1 shows a block diagram of a conventional substrate bias voltage generator 1. The circuit includes an oscillator 10, a clock generator 12, a charge pump circuit 16 and a detector 18. The circuit pumps charge into a terminal $V_{BB}$, which is connected to the substrate, and thus biases the substrate (not shown).

The oscillator 10 outputs an oscillation signal to Clock Generator 12. Oscillator 10 is only operational when a detected substrate voltage $V_{BB}$ from terminal $V_{BB}$ does not maintain a constant negative voltage. This is accomplished by having detector 18 apply an output to oscillator 10 by way of a feedback loop.

The clock generator 12 (or, referred to as a driver) supplies a rectangular wave signal(s) (also referred to as a clock signal(s) or a charge pump driving signal(s)) to the charge pump circuit 16 in response to the oscillation signal.

The charge pump circuit 16 is connected to substrate bias voltage terminal $V_{BB}$. Circuit 16 thus performs charge pump operation in response to an output from the clock generator 12. As a result, the substrate bias voltage $V_{BB}$ goes to a negative voltage level.

Figure 2:
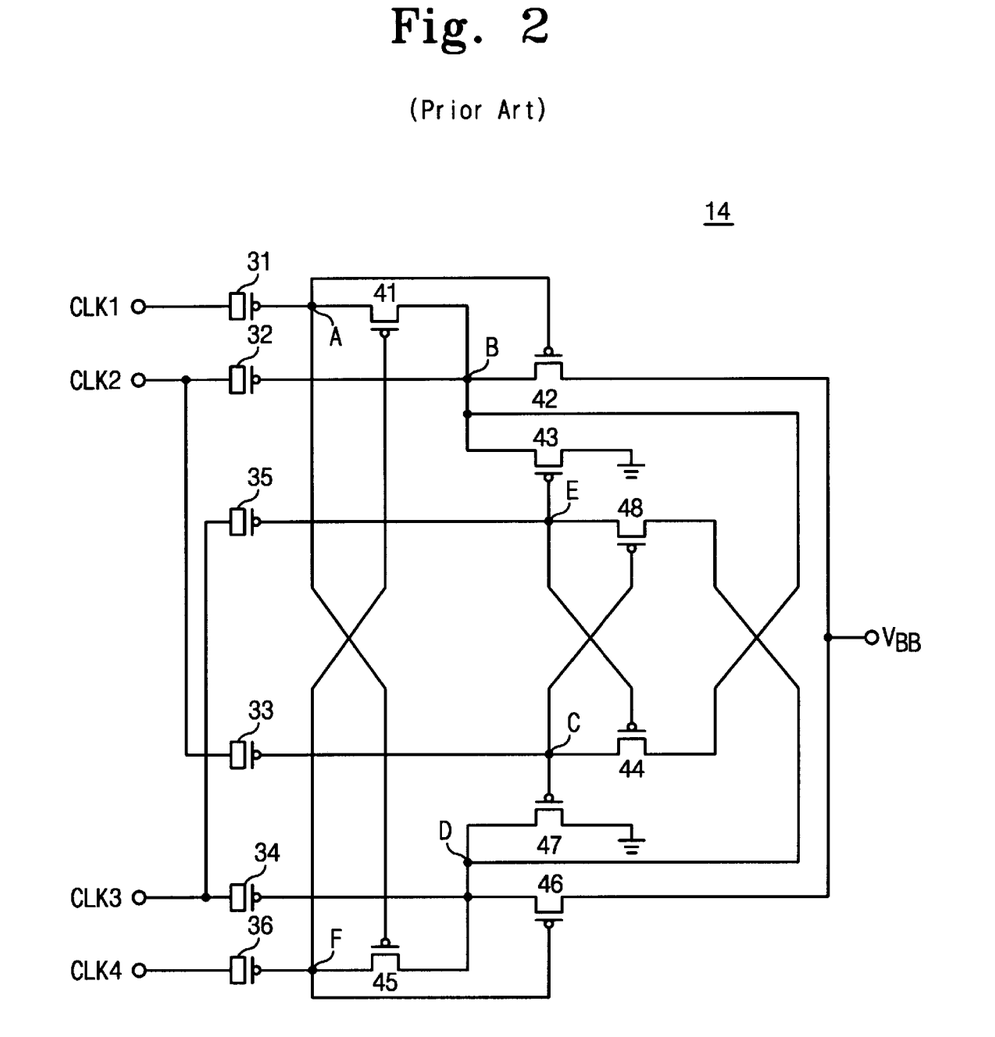
FIG. 2 is a circuit diagram of a charge pump circuit 16 of FIG. 1.

FIG. 2 shows a prior art embodiment of the charge pump circuit of FIG. 1. Its operation is disclosed in U.S. Pat. No. 5,343,088 to Jeon. U.S. Pat. No. 5,266,842 to Park, discloses another example of the charge pump circuit 16 of FIG. 1. In addition, U.S. Pat. No. 5,120,993 to Tsay et al., discloses an example of the detector of FIG. 1. These patents are incorporated herein by reference.

Figure 3:
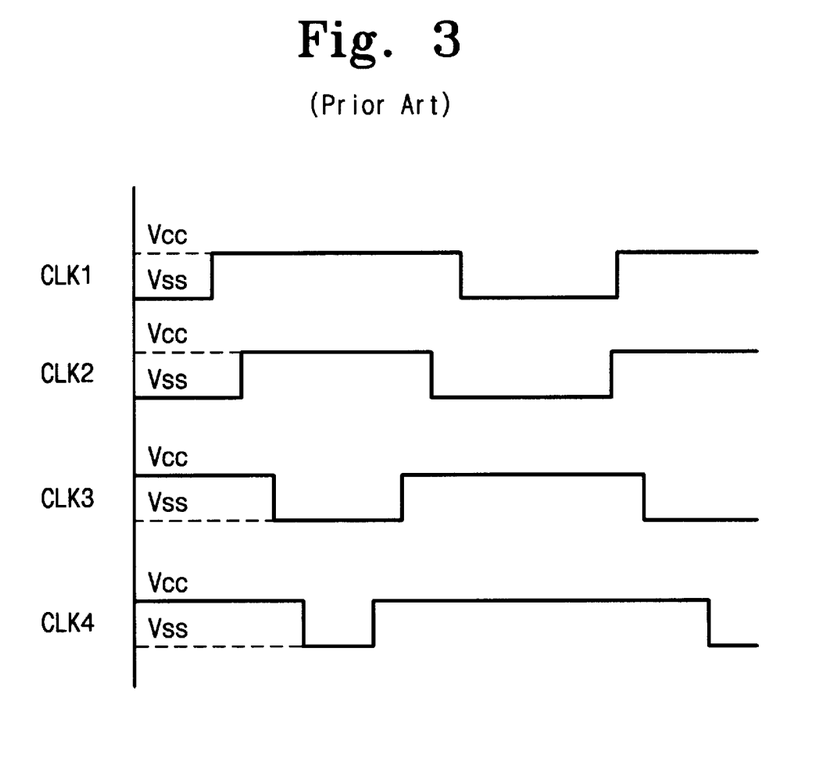
FIG. 3 is an waveform diagram showing a relationship between clock signals output by a Clock Generator 12 of the prior art.

Referring to FIGS. 1 and 3, driving signals CLK1 and CLK2 are transmitted from the clock generator 14 so as to be in-phase, but so as to have different pulse widths from one another. Similarly, driving signals CLK3 and CLK4 are also provided from the clock generator 14 and have the same phase but different pulse widths from one another. In addition, the phase of driving signals CLK1 and CLK2 is such that the phase is opposite from the phase of driving signals CLK3 and CLK4. A relationship between the driving signals CLK1 to CLK4 is depicted in FIG. 3 (refer to the '842 and '088 patents). As a result, the charge pump circuit 16 of FIG. 2 is capable of performing pump operations twice during a complete clock cycle.

A problem with the substrate bias voltage generator 1 of the prior art, is that the substrate bias voltage $V_{BB}$ isn't lowered below a value of $(-Vcc+|Vtp|)$, wherein the symbol $|Vtp|$ indicates an absolute value of the threshold voltage of each of the PMOS transistors 42 and 46. For example, where the power supply voltage Vcc is 5 Volts and the threshold voltage Vtp is 1 Volts, the substrate bias voltage $V_{BB}$ of can only be about -4 Volts. If Vcc is lowered to about 2 Volts, the substrate bias voltage generator 1 makes the substrate bias voltage $V_{BB}$ only about -1 Volts. Therefore, a pump efficiency of the substrate bias voltage generator 1 is decreased in proportion to the loss of the power supply voltage (an operating power supply voltage).

It is obvious to one skilled in the art that these problems are pervasive. The threshold voltage value of MOS transistor is fundamentally determined by a material forming the MOS transistor. Additionally, as the integration degree of a semiconductor memory device is increased, an operating power supply voltage used therein tends to be lowered increasingly. Even though the operating power supply voltage is reduced, the operation characteristics thereof must be maintained equally to that before the operating power supply voltage is lowered.

SUMMARY OF THE INVENTION

It is therefore an object of the present invention to provide a substrate bias voltage generator with an improved pump efficiency, which is used in a semiconductor device.

In order to attain the above objects, according to an aspect of the present invention, there is provided a substrate bias voltage generating circuit, which comprises an oscillator, a clock generator, a level converter and a charge pump circuit. The clock generator receives an oscillation signal from the oscillator, and then generates four clock signals. The level converter generates four charge pump driving signals corresponding to the four clock signals. The charge pump circuit responds to the four charge pump driving signals, and pumps charges to a substrate bias voltage terminal twice during a complete clock cycle, so as to maintain a substantially constant negative voltage level.

According to the invention, when the first and fourth charge pump driving signals become high, the level converter converts a voltage level that is higher than a power supply voltage level. This enables more charges to be pumped to a substrate bias voltage terminal through the charge pump circuit, so that a pump efficiency of the substrate bias voltage generating circuit is improved even though the power supply voltage is lowered.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 4:
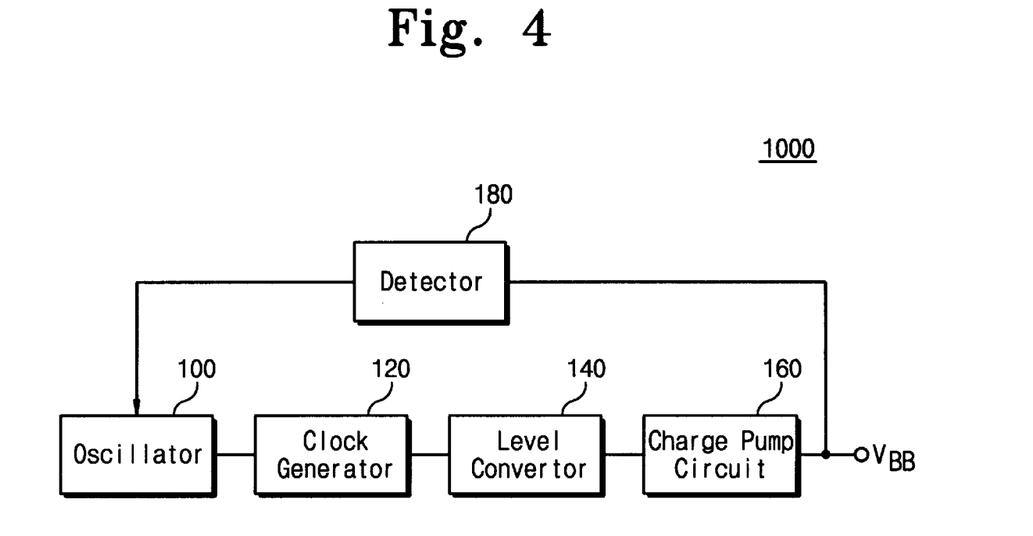
FIG. 4 is a block diagram of a substrate bias voltage generator circuit according to the present invention.

The present invention is now described. Referring to FIG. 4, a circuit 80 is made according to the invention. Circuit 80 is a substrate bias voltage generator that includes an oscillator 100, a clock generator 120, a level converter 140, a charge pump circuit 160 and a detector 180. Blocks 100, 120, 160 and 180 perform the same function as blocks 10, 12, 16, and 18 of FIG. 1, respectively. A separate description is thus omitted for blocks 100 and 180.

The feature of the present invention lies in providing a level converter 140 between the clock generator and the charge pump circuit. The clock generator 120 and the level converter 140 together are also known as a driving signal generating means.

The level converter 140 converts a voltage level of the output signal into a higher voltage level than a power supply voltage level. More specifically, power is supplied between voltage levels $V_{CC}$ and $V_{SS}$, which define a supply voltage range. The level converter includes a logic level outside the supply voltage range.

The level converter 140 receives an output signal of a first voltage level (for example, the power supply voltage Vcc level) generated from the clock generator 120, and then converts the first voltage level thereof into a second voltage Vpp level higher than the power supply voltage Vcc level. In this embodiment, a high voltage, for example, employed as a word line voltage of a semiconductor memory device, for example, DRAM device, can be used as the second voltage Vpp.

Figure 5:
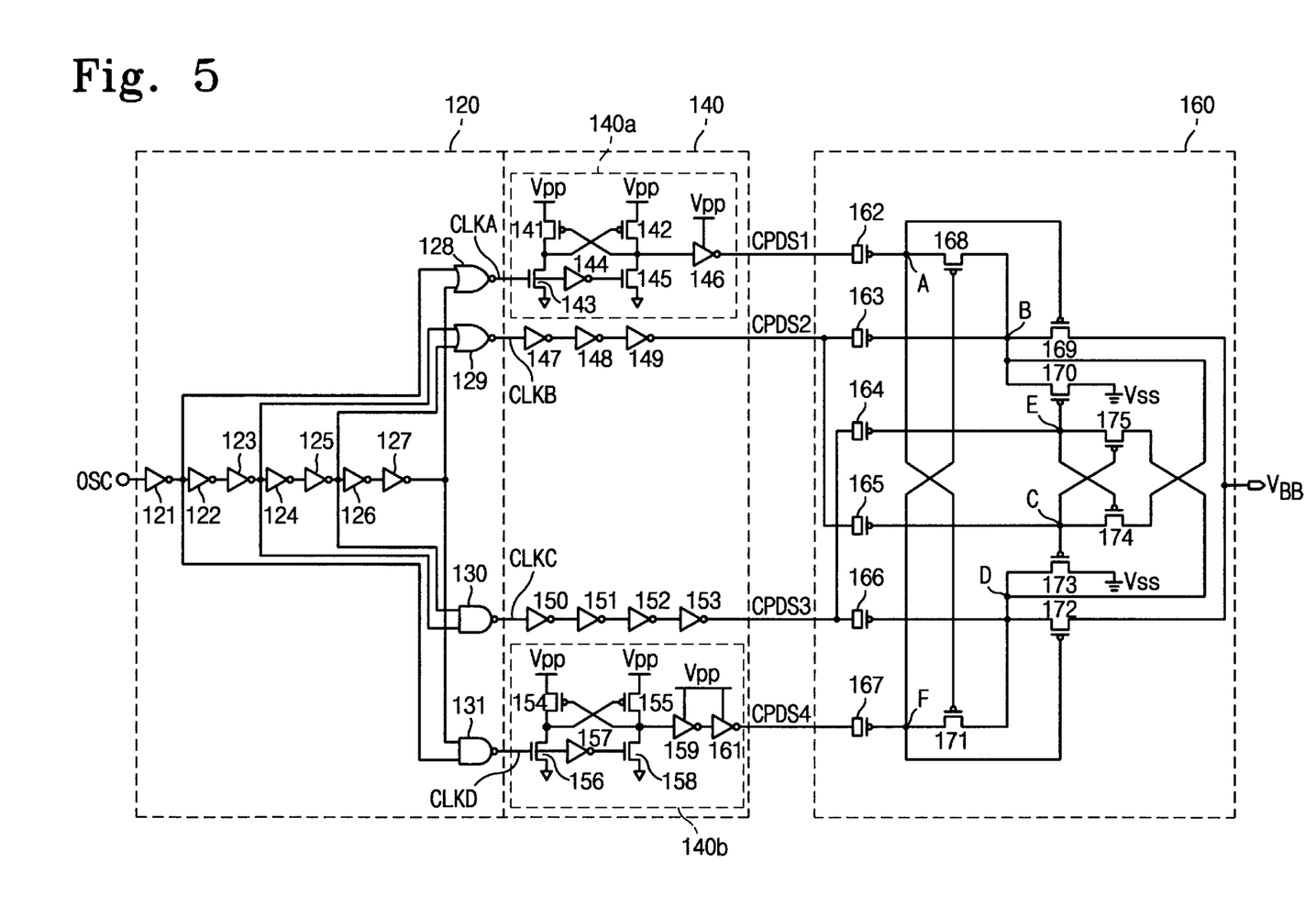
FIG. 5 is a circuit diagram showing a clock generator, a level converter and a charge pump circuit according to a preferred embodiment of the present invention.

FIG. 5 is a detailed circuit diagram showing the clock generator 120, the level converter 140 and the charge pump circuit 160 according to a first embodiment of the present invention.

As shown in the drawing, the clock generator 120 produces first to fourth clock signals CLKA, CLKB, CLKC and CLKD in response to an oscillation signal OSC from the oscillator 100. The clock generator 120 is comprised of seven inverters 121 to 127 connected in series with each other, two NOR gates 128 and 129 and two NAND gates 130 and 131 connected as illustrated in FIG. 4. The first to fourth clock signals CLKA, CLKB, CLKC and CLKD sequentially transition from high to low with a predetermined time interval (for example, corresponding to a delay time of two inverters) in that order, and the fourth to first clock signals CLKD, CLKC, CLKB and CLKA sequentially transition from low to high with the predetermined time interval in that order. That is, the first to fourth clock signals CLKA, CLKB, CLKC and CLKD have different pulse widths from each other.

Continuing to refer to FIG. 5, the level converter 140 has two level conversion portions 140a and 140b and seven inverters 147 to 153 connected as shown in the drawing. The three inverters 147, 148 and 149 correspond to "an inversion portion", and the four inverters 150, 151, 152 and 153 correspond to "a buffer portion".

The level conversion portion 140a connected to an output of the NOR gates 128 is comprised of a level shifter 140a. The level shifter 140a (also referred to as a first level shifter) has two PMOS transistors 141 and 142, two NMOS transistors 143 and 145 and two inverters 144 and 146 configured as shown in the drawing. The PMOS transistors 141 and 142 and the inverter 146 are supplied with the second voltage Vpp, which is higher than the first voltage, as power supply. Thus, the first level shifter 140a receives the first clock signal CLKA of the power supply voltage Vcc to convert it into a first charge pump driving signal CPDS1 of the second voltage Vpp level. At the same time, the first charge pump driving signal CPDS1 of the higher voltage Vpp level is inverted through the first level shifter 140a. The second clock signal CLKB is provided as a second charge pump driving signal CPDS2 into the charge pump circuit 160 through three serially-connected inverters 147, 148 and 149 (an inversion portion).

Similarly, the level conversion portion 140b connected to an output of the NAND gates 131 is comprised of a level shifter (also referred to as a second level shifter), which has two PMOS transistors 154 and 155, two NMOS transistors 156 and 158 and three inverters 157, 159 and 161 configured as shown in FIG. 5. The PMOS transistors 154 and 155 and the inverters 159 and 161 are supplied with the higher voltage Vpp as a power supply. Thus, the second level shifter 140b receives the fourth clock signal CLKD of the power supply voltage Vcc, and then converts it into a fourth charge pump driving signal CPDS4 of the higher voltage Vpp. At the same time, the clock signal CLKD of the high voltage Vpp level is inverted through the second level shifter 140b.

The third clock signal CLKC is provided to the charge pump circuit 160 through four serially-connected inverters 150 to 153 (a buffer portion) without a level conversion.

Figure 6:
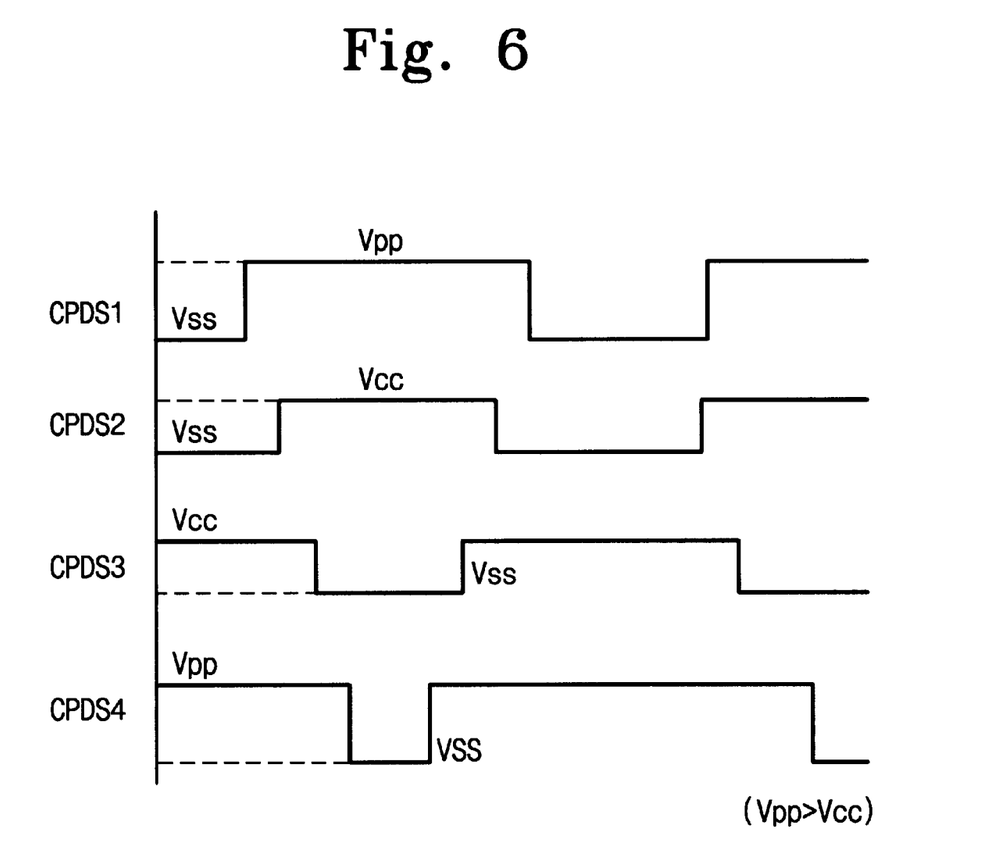
FIG. 6 is an waveform diagram showing a relationship between clock signals of the circuit of FIG. 5.

As a result, as illustrated in FIG. 6 which is a waveform diagram showing a relationship of the charge pump driving signals CPDS1 to CPDS4, the first and second charge pump driving signals CPDS1 and CPDS2 are provided which are in-phase but which have different pulse widths to one another. Likewise, the third and fourth charge pump driving signals CPDS3 and CPDS4 are in-phase but also have different pulse widths to one another. The phase of the driving signals CPDS1 and CPDS2 is opposite to the phase of the driving signals CPDS3 and CPDS4. Furthermore, each of the first and fourth charge pump driving signals CPDS1 and CPDS4 has as its logic high level a voltage Vpp level higher than the power supply voltage Vcc level.

By use of the charge pump driving signals CPDS1 to CPDS4, the charge pump circuit 160 performs pump operations twice during a complete clock cycle. The charge pump circuit 160 of the present invention is identical to that of FIG. 2, and thus a separate description thereof is omitted.

An operation according to the present invention will be described below in detail with reference to the accompanying drawings.

When first and second charge pump driving signals CPDS1 and CPDS2 are high, third and fourth charge pump driving signals CPDS3 and CPDS4 become low, that is, a ground voltage Vss level, after the lapse of a predetermined period of time. In this embodiment, when the first driving signal CPDS1 becomes a logic high level, it has the voltage Vpp level higher than the power supply voltage Vcc level.

At such time, the voltages at nodes D and E are forced to a negative power supply voltage −Vcc level by pump capacitors 166 and 164, and the voltage at node F is forced to a negative high voltage −Vpp level by pump capacitor 167. In turn, the PMOS transistors 168, 170, 172 and 174 are turned on. Charges which have flowed to node B from a substrate bias voltage terminal $V_{BB}$ during a previous half clock cycle are discharged to ground Vss through the PMOS transistor 170 thus turned on.

Because charges from the substrate bias voltage terminal $V_{BB}$ are also transferred to node A through the NMOS transistor 168, the voltage at the node A is maintained higher than the ground voltage Vss level. Accordingly, the PMOS transistor 169 is turned off and the node B becomes electrically disconnected from the substrate bias voltage terminal $V_{BB}$.

Furthermore, because charges from the substrate bias voltage terminal $V_{BB}$ are also transferred to node C through the PMOS transistor 174, the voltage at the node C is maintained higher than the ground voltage Vss level. Accordingly, the PMOS transistor 173 is turned off and the node D is disconnected from ground Vss. In turn, the PMOS transistor 175 is turned off and the voltage at the node E is maintained higher than the negative power supply voltage −Vcc level.

At this point in time, as contrasted with the prior art, more charges are transferred to the node D from the substrate bias voltage terminal $V_{BB}$ through the PMOS transistor 172. This is because the gate of the PMOS transistor 172 is connected to the node F having about a negative high voltage −Vpp level, Namely, to the gate of the PMOS transistor 172, there is supplied a voltage enough to overcome a threshold voltage Vtp causing a loss of such pump efficiency induced when a power supply voltage Vcc is lowered. As a result, the substrate bias voltage terminal $V_{BB}$ drops to a negative voltage.

When third and fourth charge pump driving signals CPDS3 and CPDS4 become high and first and second charge pump driving signals CPDS1 and CPDS2 does low, that is, a ground voltage Vss level, the node A has a negative high voltage −Vpp level by pump capacitor 162, and the nodes B and C have a negative power supply voltage −Vcc level by pump capacitors 163 and 165, respectively. This is because the third charge pump driving signal CPDS3 has the power supply voltage Vcc and the fourth charge pump driving signal CPDS4 has a voltage Vpp higher than the power supply voltage Vcc. In turn, the PMOS transistors 169, 171, 173 and 175 are turned on.

Charges with has flowed to the node D from the substrate bias voltage terminal $V_{BB}$ during a previous half clock cycle are discharged to ground through the PMOS transistor 173. Because charges from the substrate bias voltage terminal $V_{BB}$ are transferred to the node F through the PMOS transistor 171, the voltage at the node F is maintained higher than the ground voltage Vss level by way of the PMOS transistor 171. Accordingly, the PMOS transistor 172 is turned off and the node D is electrically isolated from the substrate bias voltage terminal $V_{BB}$.

Because charges from the substrate bias voltage terminal $V_{BB}$ are also transferred to the node E through the PMOS transistor 175, the voltage level at the node E is maintained higher than the ground voltage Vss level. Accordingly, the PMOS transistor 174 is turned off such that the voltage level at the node C is maintained higher than negative power supply voltage −Vcc level.

At this point in time, as contrasted with the prior art, more charges from substrate bias voltage terminal $V_{BB}$ are transferred to the node B through the PMOS transistor 169. This is because the gate of the PMOS transistor 169 is connected to the node A having about a negative high voltage −Vpp lower than −Vcc. Namely, to the gate of the PMOS transistor 169, there is supplied a voltage enough to overcome a threshold voltage Vtp causing a loss of such pump efficiency induced when a power supply voltage Vcc is lowered. As a result, the substrate bias voltage terminal $V_{BB}$ drops to a negative voltage.

As set forth above, since charges from the substrate bias voltage terminal $V_{BB}$ are transferred to the node B or D through corresponding PMOS transistor 169 or 172 whose gate receives a negative voltage −Vpp level lower than a negative power supply voltage −Vcc level, the substrate bias voltage $V_{BB}$ ideally becomes lowered down to about a negative voltage of (−Vpp+|Vtp|). The symbol |Vtp| indicates an absolute value of the threshold voltage of each of the PMOS transistors 169 and 172.

Figure 7:
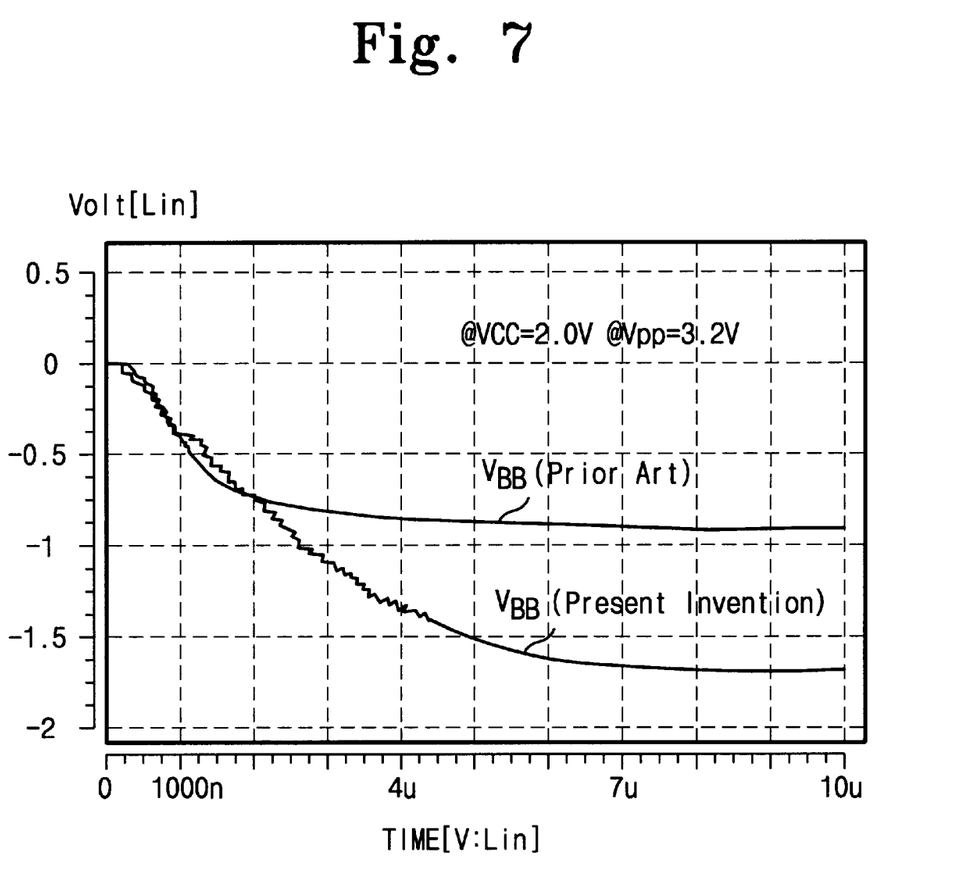
FIG. 7 is a diagram showing a contrast between the time development of substrate bias voltages of the present invention and the prior art.

Referring to FIG. 7, an example is shown. Assume that the power supply voltage Vcc is 2 Volts, the high voltage Vpp is 3.2 Volts, and the absolute value of the threshold voltage |Vtp| is 1 Volts. Under the condition, referring to FIG. 7, the substrate bias voltage generator 1000 of FIG. 4 generates the substrate bias voltage $V_{BB}$ of about −2 Volts, while the substrate bias voltage generator 1 of the prior art produces the voltage $V_{BB}$ of about −1 Volts. This means that the substrate bias voltage $V_{BB}$ is nearly equal to a negative power supply voltage −Vcc. Even though a power supply voltage Vcc is lowered, a loss of pump efficiency is prevented, because PMOS transistor 169/172 in the charge pump circuit 160 is driven by the corresponding charge pump driving signal CPDS1/CPDS4 having a voltage higher than the power supply voltage Vcc (that is, the drawback of the prior art is overcome).

Figure 8:
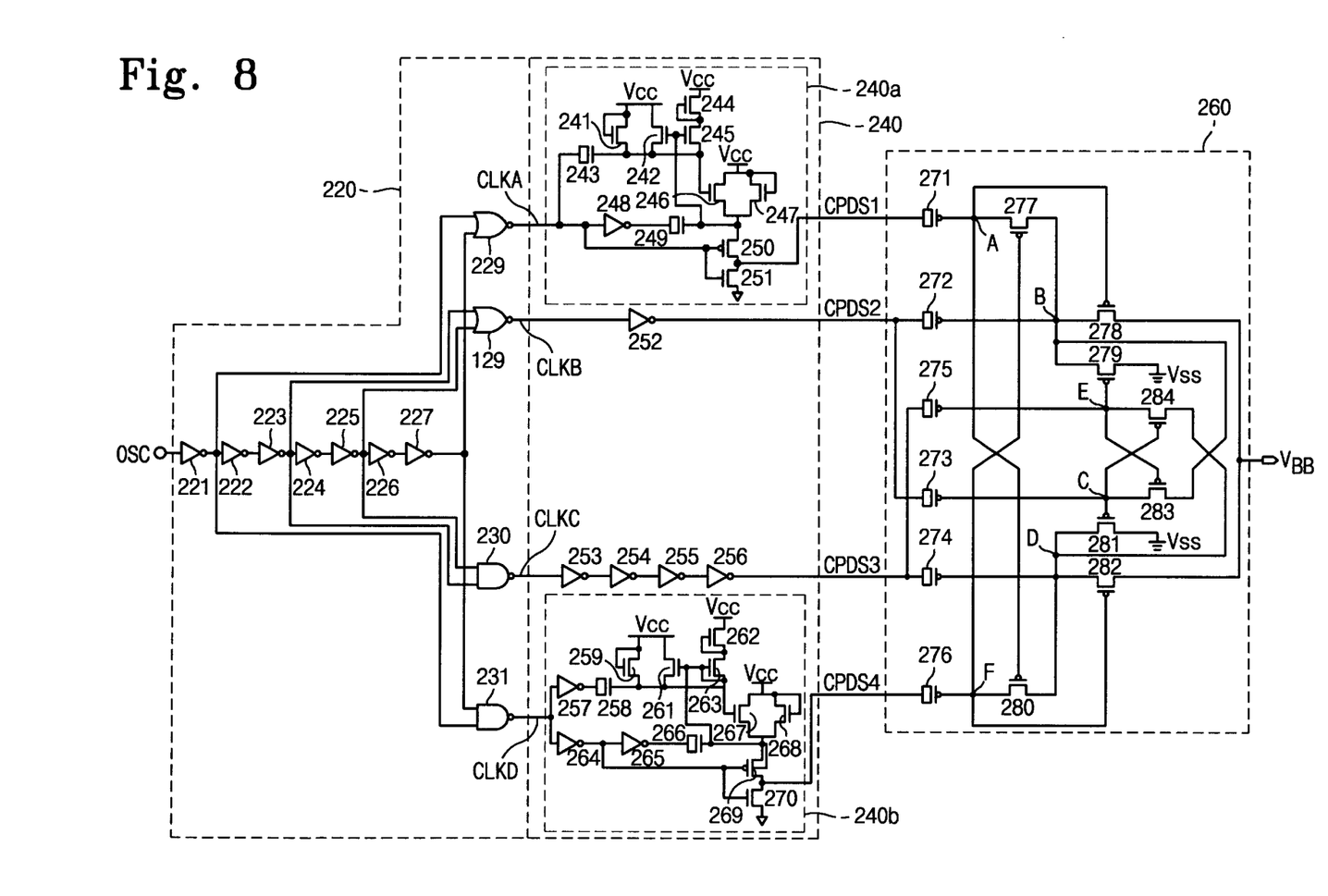
FIG. 8 is a circuit diagram showing a clock generator, a level converter and a charge pump circuit according to another embodiment of the present invention.

Referring to FIG. 8 a second embodiment of the level converter of the invention is described. The second embodiment is identical to the first embodiment except in the construction of level converter 240. Specifically, clock generator 220 is identical to clock generator 120 of FIG. 5, and charge pump circuit 260 is identical to charge pump circuit 160 of FIG. 5.

Level converter 240 includes two pump circuits 240a and 240b instead of a level shifter. Each of the pump circuits 240a and 240b of FIG. 8 generates a voltage higher than the power supply voltage Vcc by itself.

Circuit 240b works the same way as circuit 240a, except that inverters 257 and 264 ensure opposite phase.

As a result, it is obvious that the substrate bias voltage generator of the second embodiment has the same effect and function as that of the first embodiment. That is, even though a power supply voltage Vcc is lowered, a loss of pump efficiency is prevented because PMOS transistor 278/282 in the charge pump circuit 260 is driven by the corresponding charge pump driving signal CPDS1/CPDS4 having a voltage higher than the power supply voltage Vcc.

A person skilled in the art will appreciate that the second embodiment does not require implementing a conduit for Vpp.

In the first and second embodiments, various circuits of converting a voltage level and of generating a voltage higher than the power supply voltage Vcc by oneself may be used as substitutes of the level shifter and the pump circuit.

In addition, the present invention can be practiced for the opposite polarities than what has been described. The voltage received by the level shifter or generated by the pump circuits can be equivalent below Vss.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A substrate bias voltage generating circuit of a semiconductor device receiving power between voltage levels that define a supply voltage range for pumping charges to a substrate bias voltage terminal, comprising:

an oscillator for generating at least two oscillation signals;

a driving signal generator coupled to the oscillator for producing one charge pump driving signal in response to each of the oscillation signals, wherein at least two of the driving signals include a logic level outside the supply voltage range; and a charge pump circuit coupled with the driving signal generator and with the substrate bias voltage terminal, the charge pump circuit coupled for receiving the charge pump driving signals with the logic level outside the supply voltage range and thereby pumping charges to the substrate bias voltage terminal.

2. The substrate bias voltage generating circuit according to claim 1, wherein the driving signal generator includes a level shifter receiving power at a voltage level outside the supply voltage range.

3. The substrate bias voltage generating circuit according to claim 1, wherein the driving signal generator includes a pump circuit for generating power at a voltage level outside the supply voltage range.

4. A substrate bias voltage generating circuit of a semiconductor device for pumping charges to a substrate bias voltage terminal, comprising:

an oscillator for generating an oscillation signal;

a clock generator coupled to receive the oscillation signal, for generating first to fourth clock signals in response thereto, wherein the first to fourth clock signals have different pulse widths from each other;

a level converter coupled to receive the first to fourth clock signals, for producing first to fourth charge pump driving signals corresponding respectively to the first to fourth clock signals, each of the first and the fourth charge pumping driving signals having a logic high voltage level higher than a power supply voltage level, each of the first and the second charge pumping driving signals having a phase opposite from a phase of the third and fourth charge pump driving signals; and a charge pump circuit responsive to the first to fourth charge pump driving signals, for pumping charges to the substrate bias voltage terminal.

5. The substrate bias voltage generating circuit according to claim 4, wherein the first to fourth clock signals sequentially transition from high to low with a predetermined time interval in that order, and the fourth to first clock signals sequentially transition from low to high with the predetermined time interval in that order.

6. The substrate bias voltage generating circuit according to claim 4, wherein the level converter comprises:

a first level conversion component for converting a voltage level of the first clock signal having a logic high voltage level into a voltage level higher than the power supply voltage level, and for inverting a phase of the first clock signal for producing the first charge pump driving signal;

an inversion component for inverting a phase of the second clock signal for producing the second charge pump driving signal;

a buffer component for receiving the third clock signal for producing the third charge pump driving signal; and a second level conversion component for converting a voltage level of fourth clock signal having a logic high voltage level into the higher voltage level for producing the fourth charge pump driving signal.

7. The substrate bias voltage generating circuit according to claim 6, wherein one of the first and second level conversion components comprises a level shifter which generates the higher voltage level.

8. The substrate bias voltage generating circuit according to claim 6, wherein one of the first and second level conversion components comprises a pump circuit which generates the higher voltage level by using only the power supply voltage.

* * * * *

UNITED STATES PATENT AND TRADEMARK OFFICE
CERTIFICATE OF CORRECTION

PATENT NO.      : 6,198,341 B1                                      Page 1 of 1
DATED           : March 6, 2001
INVENTOR(S)     : Ryu It is certified that error appears in the above-identified patent and that said Letters Patent is hereby corrected as shown below:

<u>Column 4,</u>
Line 53, "scrially-connected" should read -- serially-connected --.

Signed and Sealed this

Seventh Day of May, 2002

*Attest:*

JAMES E. ROGAN
*Attesting Officer*        *Director of the United States Patent and Trademark Office*